United States Patent [19]

Atwell et al.

[11] Patent Number: 5,041,484

[45] Date of Patent: Aug. 20, 1991

[54] FLAME RETARDANT HOT MELT ADHESIVE COMPOSITIONS USING BROMINATED STYRENE/ATACTIC POLYPROPYLENE GRAFT COPOLYMERS

[75] Inventors: Ray W. Atwell, W. Lafayette; Donna L. Collison; Nicolai A. Favstritsky, both of Lafayette; Enrico J. Termine, Lafayette, all of Ind.

[73] Assignee: Great Lakes Chemical Corporation, West Lafayette, Ind.

[21] Appl. No.: 540,836

[22] Filed: Jun. 20, 1990

[51] Int. Cl.$^5$ .................... C09J 91/06; C08L 91/06
[52] U.S. Cl. .................................. 524/278; 524/272; 524/273; 524/487; 524/488; 524/489; 525/288
[58] Field of Search ............... 524/272, 273, 278, 487, 524/488, 489; 525/288

[56] References Cited

U.S. PATENT DOCUMENTS 4,179,401  7/1979  Garnett et al. ..................... 522/1

Primary Examiner—Paul R. Michl
Assistant Examiner—U. K. Rajguru
Attorney, Agent, or Firm—Woodard, Emhardt, Naughton, Moriarty & McNett

[57] ABSTRACT

Flame retardant hot melt adhesives include atactic polypropylene having grafted thereon a ring-halogenated styrene. The compositions may also include homopolymers of the styrene monomer or equivalents, as well as non-halogenated atactic polypropylene. Tackifying agents, waxes, anti-oxidants and other additives may also be included.

27 Claims, No Drawings

FLAME RETARDANT HOT MELT ADHESIVE COMPOSITIONS USING BROMINATED STYRENE/ATACTIC POLYPROPYLENE GRAFT COPOLYMERS

BACKGROUND OF THE INVENTION

1. Field of the Invention

The present invention relates to the field of compositions useful in the manufacture of hot melt adhesives and to the adhesive compositions themselves, and particularly to the preparation of flame retardant hot melt adhesives containing atactic polypropylene.

2. Description of the Prior Art

Atactic—also known as amorphous—polypropylene (APP) was for years an undesirable by-product of isotactic polypropylene production. Due to its low price, APP soon found its way into many applications, including use in adhesive formulations. Eventually, opportunities arose for APP adhesives requiring that they possessed some degree of flame retardancy.

A hot melt adhesive is generally manufactured from a mixture of three components: a thermoplastic resin capable of providing cohesion of the mixture, a petroleum resin having a tackifying effect, and a paraffin or a microcrystalline polymeric wax capable of adapting the viscosity of the mixture to the processing and use conditions of the adhesive. In choosing the thermoplastic resin part of the mixture, good properties are sought in respect to heat stability and adhesiveness. The thermoplastic resins commonly used in compositions for the manufacture of hot melt adhesives have included copolymers of ethylene and vinyl esters, particularly vinyl acetate, or copolymers of ethylene and alkyl acrylates, particularly ethyl acrylate and butyl acrylate.

A typical hot melt adhesive formulation is described in U.S. Pat. No. 4,325,853, issued to Acharya et al. on Apr. 20, 1982. This patent indicates that a typical adhesive comprises, for example, ethylene copolymer, a tackifier and a wax. The Acharya patent is directed to the particular use of alkenyl succinic anhydride in combination with ethylene copolymer and a tackifying resin. It is indicated that wax-like materials and anti-oxidants may also be used. Among the ethylene copolymers mentioned are ones with vinyl acetate or with acrylic and methacrylic acid.

A general form of hot melt adhesive is also described in U.S. Pat. No. 4,404,299, issued to Decroix on Sept. 13, 1983. The Decroix patent indicates the adhesive to conventionally include a thermoplastic resin, a tackifying resin, and a paraffin or other wax-like substance for modifying the melt viscosity. Particularly described in the Decroix patent is the use of a terpolymer of ethylene and minor parts of alkyl acrylate or methacrylate and of maleic anhydride.

While atactic polypropylene (APP) has been found to be suited for use in hot melt adhesives, there has remained a desire to improve the flame retardancy of APP without adversely affecting the other desirable properties of APP. Approaches to this problem have included the modification of APP directly or the addition of flame retardants into the overall adhesive formulation.

Improvement of flame retardancy has relied on modifications to atactic polypropylene, or on additives for the APP, but disadvantages have been associated with both approaches. Although a vast number of modified polypropylene compositions have been described or theorized in the prior art, few if any suitable flame retardant APP derivatives have been identified. Similarly, numerous additives for increasing the flame retardancy of atactic polypropylene have been studied and some are commercially available. Nonetheless, there is at present no commercially available flame retardant additive for atactic polypropylene which provides adequate retention of physical properties, and demonstrates high thermal stability and absence of solids at processing temperatures. The present invention contemplates a modification of atactic polypropylene which yields a composition that retains the desirable physical properties of atactic polypropylene, and avoids the disadvantages of alternate approaches.

Hot melt adhesive formulations can be made flame retardant by the addition of halogenated liquid and/or solid additives. However, liquid additives weaken the adhesive bond strengths by dilution and plasticization of the adhesive formulation. On the other hand, solid additives act as fillers, and can result in settling and lower tensile strengths. Present adhesive dispensing systems are not generally equipped with stirrers, and solid insoluble flame retardant additives which settle out of the adhesive can clog feed lines.

State of the art methods for rendering APP flame retardant consist of blending with inert additives, an approach which has not been entirely successful. Sedimentation of the additive in the melt vessel or transfer lines, thermal instability, volatility, migration out of the adhesive, high viscosity and poor adhesive strength are problems associated with various additive-type flame retardants. We have found that ring brominated styrene, when grafted to APP, provides a novel composition that is useful as a flame retardant hot melt adhesive. Furthermore, adhesive strength and melt viscosities are actually improved over the base polymer.

One method of conferring flame retardancy to APP is to chlorinate it by grafting chlorine atoms directly onto it. G. M. Ronkin, et al., "Structure and Properties of Chlorinated Polypropylene", *Plast. Massy*, 1987, 3, 20-23, report that the direct chlorination of isotactic and amorphous atactic polypropylene provides flame resistance and self-extinguishing properties, but with decreased strength. In U.S. Pat. No. 3,291,862, issued to W. B. Armour, et al. on Dec. 13, 1966, it is similarly disclosed that chlorinated atactic polypropylene yields fire retardation accompanied by increased elongation and decreased tensile and peel strength. While this approach would solve the problem of flame retardant sedimentation, the relatively low strength of the non-aromatic carbon-chlorine bond is not sufficient to prevent thermal degradation over the long periods and high temperatures to which hot melt adhesives are subjected.

Certain molecular flame retardants have been grafted onto APP by other researchers. M. Hartman, et al., "Graft Copolymerizations of Vinylphosphonic Acid Derivatives on Atactic Polypropylene", *Z. Chem.*, 1980, 20(4), 146-7, describe the use of vinyl phosphonates to flame retard APP. There is no indication that the grafts are useful as flame retardant adhesives.

The most widely used method to produce a flame retardant hot melt adhesive is to add a non-reactive halogenated material. In U.S. Pat. No. 4,169,082, issued to Kusterer on Sept. 25, 1979, there is disclosed the use in a hot melt adhesive of commercially available chlorinated (preferred) or brominated waxes in combination with paraffin wax, a halogen scavenger, and flame and smoke suppressants. The use of chlorinated paraffin as an additive to atactic polypropylene in a hot melt adhesive is described in U.S. Pat. No. 3,803,067, issued to Kehr, et al. on Apr. 9, 1974. M. Kellner, et al., in Czechoslovakia Patent No. 176,612, issued on Jan. 15, 1979, disclosed the use of polychlorobiphenyl with ethylene vinyl acetate copolymer and/or atactic polypropylene for use in a hot melt adhesive. While these approaches have succeeded in minimizing unmelted solids in the composition, the additives introduce problems of poor thermostability in the case of the paraffin and unacceptable toxicity for the PCB.

Various non-halogenated monomers have been grafted to polypropylene in accordance with the prior art. For example, maleic anhydride is commonly grafted to atactic polypropylene to increase adhesive bond strength. In U.S. Pat. No. 4,049,602, issued to Albers on Sept. 20, 1977, there is disclosed the grafting of unbrominated styrene to atactic polypropylene for the purpose of producing an inherently white adhesive without the use of opacifying fillers.

U.S. Pat. No. 3,034,939, issued to Newkirk, et al. on May 15, 1962, discusses fire extinguishing properties for a hot melt adhesive composition containing chlorinated biphenyls and/or chlorinated paraffins as flame retardants. The use of the former material is now EPA regulated due to PCB contamination problems. The latter material is subject to dehydrochlorination if allowed to stand at the 270°-350° F. temperature required for use. Additionally, antimony trioxide and calcium carbonate (which tend to settle out) are required. There is no adhesive data in the Newkirk, et al. patent.

In U.S. Pat. No. 4,279,808, issued to Hornbaker et al. on July 21, 1981, there is described a method for the preparation of polybromostyrene resin by the addition polymerization of nuclear brominated styrene. The Hornbaker et al. patent is limited to the addition polymerization of bromostyrene in the presence of specified rubbery polymers, namely SBR rubber (butadiene-styrene copolymers), EPR rubber (ethylenepropylene copolymers), EPDM rubber (i.e. terpolymers of ethylene, propylene and a diene monomer), polyisoprene rubber (e.g. cis-1,4-polyisoprene and trans-1,4-polyisoprene), Neoprene (i.e. polymers and copolymers of 2-chloro-1,3-butadiene), cis-1,4-polybutadiene, and polybutadienes having mixed structures (e.g. cis-1,4; trans-1,4 and 1,2 structures), with the polybutadienes being particularly preferred.

Other commercial flame retardants, such as decabromodiphenyl oxide (DDPO) are also used in flame retardant hot melt adhesives, as described in U.S. Pat. No. 4,727,107, issued to McConnell, et al. on Feb. 23, 1988. DDPO is an insoluble solid melting at 300°-315° C., which acts as a filler and can settle out of the adhesive formulation. The McConnell patent claims the use of decabromodiphenyl ether in flame retardant hot melt adhesives for polyurethane foams and fabrics. The use of antimony oxide is also claimed. These materials will settle out of the adhesive mixture. Also, formulating the adhesive is cumbersome due to the pre-melting and mixing of the flame retardant and antimony oxide with polyester to form a concentrate which is then back added to the base polyester for application. No adhesive data is given in the McConnell patent.

Outside of the field of flame retardancy, various modifications to polyolefins have been proposed. For example, U.S. Pat. No. 3,177,270, issued to Jones et al. on Apr. 6, 1965, describes a method for modifying polyolefins for the purpose of improving tensile strength, elongation and/or flexural modulus. The Jones et al. patent specifically describes the preparation of ethylene polymer which is modified with styrene, a styrene/acrylonitrile mixture, dichlorostyrene or a mixture of isomeric vinyltoluenes. The Jones et al. patent additionally lists other possible polymeric substrates for use in the described method as including polypropylene, polyisobutylene, polybutene, and copolymers of ethylene and propylene, ethylene and isobutylene, and ethylene and butene. The patent indicates that other copolymers that can be used include those containing a predominant amount of one or more aliphatic olefins chemically combined or interpolymerized with a minor proportion of another monoethylenically unsaturated organic compound, such as copolymers of a predominant amount of ethylene and a minor proportion of styrene, vinyl acetate or methyl methacrylate. Possible graft monomers are listed as including styrene, vinyltoluene, vinylxylene, ethylvinylbenzene, isopropyl styrene, para-tert-butyl styrene, dichlorostyrene, bromostyrene, fluorostyrene, or mixtures thereof with acrylic acid, methacrylic acid, acrylonitrile, methacrylonitrile, methyl methacrylate or maleic anhydride.

U.S. Pat. No. 4,179,401, issued to Garnett et al. in 1979, relates to a process for producing a heterogenous catalyst for the hydrogenation, hydroformylation, isomerization, cracking or dehydrogenation of organic molecules. The Garnett process comprises the steps of radiation grafting a monomer having an alpha-unsaturated bond to a metal or an organic polymer and complexing a nitrogen, halogen, or phosphorous containing group to the monomer. The Garnett et al. patent lists many possible polymer/monomer combinations. Identified polymer substrates included polyvinyl compounds, polyolefins, polyvinylidenes, polysiloxanes, polydienes, polyethers, polyimides, polysulphones, polyesters, polyamides, polyurethanes, polycarbonates and polyureas. Listed as possible monomers for use in the described process were p-nitrostyrene, p-amino styrene, p-chlorostyrene, vinyldiphenylphosphine, cis bis (1,2-diphenylphosphino) ethylene, triallylphosphine, divinylphenylphosphine and many more.

The graft atactic polypropylene polymers used in the present invention do not suffer the drawbacks of having insoluble flame retardants which act as fillers, increase melt viscosity, and require the use of solid antimony synergists or other flame retardant enhancing agents. Since the grafts are polymeric and compatible in the adhesive formulation, they do not perform like liquid flame retardants which can weaken and migrate from adhesive bonds.

SUMMARY OF THE INVENTION

In one aspect of the present invention there is provided a flame retardant hot melt adhesive composition including atactic polypropylene having grafted thereon a ring-halogenated styrene. The flame retardant graft copolymer is represented by the formula:

$$\text{APP} \atop | \atop (S)_n$$

in which n is an integer > 1, APP is atactic polypropylene, and S is a side chain grafted to the APP and having monomeric units of the formula:

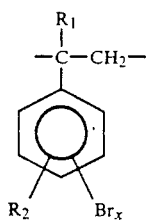

wherein x=1 to 4, $R_1$ is H or $CH_3$, and $R_2$ is H or a $C_{1-4}$ lower alkyl group. The compositions may also include homopolymers of the styrene monomer or an equivalent, as well as non-grafted atactic polypropylene. Tackifying agents, waxes, anti-oxidants and other additives may also be included.

It is an object of the present invention to provide hot melt adhesives which have desirable physical properties and improved flame retardancy.

A further object of the present invention is to provide hot melt adhesives which do not include flame retardant additives which adversely affect physical properties, such as melt viscosity, or which settle out of the composition.

Further objects and advantages of the present invention will be apparent from the description which follows.

DESCRIPTION OF THE PREFERRED EMBODIMENT

For the purposes of promoting an understanding of the principles of the invention, reference will now be made to preferred embodiments of the invention and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

Hot melt adhesives are used in a variety of applications. They are generally characterized as solid, thermoplastic materials which quickly melt upon heating, and which then set to a firm bond on cooling. Since hot melt adhesives offer almost instantaneous bonding, they are well suited to automated operations. In general, they are low cost, low-strength products, which are entirely adequate for bonding cellulosic and other materials. Such adhesives have specific uses, for example, for bookbinding, food cartons, side seaming of cans, and miscellaneous packaging applications.

Various formulations for hot melt adhesives are well known in the art. Ingredients typically include a thermoplastic resin such as polyethylene, polypropylene or polyvinyl acetate, along with a tackifying agent and a wax-like material. Compositions including atactic polypropylene (APP), or for which APP is useful, are known in the art. There has remained a desire for APP-containing hot melt adhesives that retain the desirable properties of APP, but which have improved flame retardancy as afforded by the present invention.

The present invention provides novel hot melt adhesive compositions having advantageous adhesive properties and increased flame retardancy. The compositions include a modified atactic polypropylene which has been grafted with ring halogenated styrenes, such as dibromostyrene or the like. This modified APP may be used alone as a hot melt adhesive, or more typically is used in combination with other standard ingredients of hot melt adhesives, such as tackifiers and waxes, as previously mentioned. It is an aspect of the present invention that the modified APP is useful essentially equally to the conventional, non-halogenated APP. For prior compositions with which APP has been used or could be used, the modified APP of the present invention has been found to be an equivalent substitute in terms of compatibility, but superior in terms of flame retardancy. Thus, the present invention relates to the use of the described, grafted APP as a substitute for some or all of the APP which has otherwise been used in the variety of known hot melt adhesive formulations.

The present invention utilizes compositions which have physical properties comparable to that of atactic polypropylene, but which have improved flame retardancy. In the broadest sense, atactic polypropylene is modified by grafting a ring-brominated vinyl aromatic onto the atactic polypropylene. The presence of the bromine contributes to the flame retardancy of the resulting polymer. A significant portion of the bromine present in the APP compositions utilized in the present invention is grafted onto the atactic polypropylene through the monomeric unit. In addition, it is contemplated that the APP compositions may also include bromine in the form of homopolymers of the monomer used in grafting the atactic polypropylene, or of comparable monomer. Although not to be considered limiting of the present invention, it is believed that the compatibility of the grafted atactic polypropylene and the homopolymer contributes to the desirable properties of the resulting composition.

In accordance with the above discussion, the flame retardant hot melt adhesives of the present invention include a flame retardant polymer composition comprising a graft copolymer represented by the formula:

$$\begin{array}{c} APP \\ | \\ (S)_n \end{array}$$

in which n is an integer  1, APP is atactic polypropylene, and S is a side chain grafted to the APP and having monomeric units of the formula:

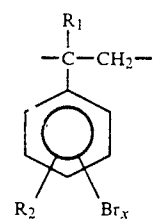

wherein x=1 to 4, $R_1$ is H or $CH_3$, and $R_2$ is H or a $C_{1-4}$ lower alkyl group.

The graft base may be selected from a variety of amorphous polyolefin including paraffin waxes, materials commonly known as the poly-alpha-olefins such as poly(1-butene), as well as elastomeric polyolefins such as polyisobutylene and ethylene/propylene copolymers. Modified amorphous polyolefins such as those that have been maleated or grafted with acrylic acid or its derivatives may also be used. (Note that amorphous polyolefins are commonly characterized by their high degree of solubility in aliphatic solvents such as n heptane.) Blends or copolymers of any of these materials are also suitable as graft bases. The preferred polymer is atactic Polypropylene. By way of example, we have found that APP having a ring and ball softening point (ASTM E 28-67) of 277° F. (136° C.) and a melt viscosity of 9,900 centipoise at 300° F. (149° C.) available from The International Group, Inc. of Ontario, Canada, is suitable for our application.

The atactic polypropylene is grafted with a ring halogenated vinyl aromatic which may contain bromine or chlorine, or mixtures of bromine and chlorine, and which may also be ring substituted with one or more aliphatic groups such as methyl, ethyl, propyl isomers, t-butyl and the like. More preferably, it is a brominated styrene and may contain from 1 to 4 bromine atoms per ring, or mixtures of degrees of bromination from 1 to 4, particularly so that the overall composition contains a high percentage of bromine while remaining in liquid form at room temperature. (Pure tri-, tetra- and pentabromostyrene are solids.) The most preferred monomer is dibromostyrene. As produced by Great Lakes Chemical it normally contains about 15% monobromostyrene and 3% tribromostyrene by weight. The halogenated monomer may also contain various storage stabilizers such as phenols and compounds of sulfur, nitrogen and phosphorous known to the industry to inhibit premature polymerization. Accordingly, preferred brominated monomers suitable for preparation of the graft polymerized APP products have the formula:

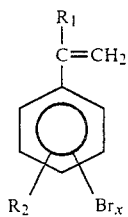

wherein $x = 1$ to 4, $R_1$ is H or $CH_3$, and $R_2$ is H or a $C_{1-4}$ lower alkyl group.

The halogenated monomer is grafted to the polypropylene using known methods including irradiation, peroxidation by exposure to oxygen at elevated temperatures, and abstraction of protons by free radical initiators. The graft polymerization may be performed using solution, suspension, emulsion or bulk procedures. The preferred method uses a free radical initiator such as dicumylperoxide, benzoylperoxide, t-butylperbenzoate, 2,2'-azobis(isobutyronitrile), cumenehydroperoxide or the like dissolved in the halogenated monomer at levels from 0.1% to 5% on weight of the monomer, preferably from 1% to 3%, the solution being added to agitated molten polypropylene. The grafting is best carried out in a kneading type mixer such as a Banbury, in an extruder, or on a two roll mill.

The quantity of monomer added is such that a flame retarding amount of bromine is present in the grafted composition, normally from 5% to 50% bromine, with 15% to 45% bromine being preferred. Alternatively, an excess of halogenated monomer may be added to produce a concentrate with levels of 10% to 60% bromine, preferably 30% to 50%, which may be let down with ungrafted polypropylene to obtain the final composition. The advantage in this approach is the maximization of physical strength properties by the introduction of atactic polypropylene into the composition which has not been exposed to the harsh conditions of the grafting process.

Chain transfer agents may also be dissolved into the monomer prior to grafting in order to control the molecular weight of the halogenated polymer, thereby lowering the melt viscosity of the adhesive composition. Alkyl halides and mercaptans are particularly useful, with 1-dodecanethiol being preferred. Loadings from 0.1% to 5% on weight of the monomer may be used, with 0.5% to 3% being typical.

During the grafting process a minor amount of other reactive unsaturated co-monomers can be mixed into the halogenated styrene for the purpose of additional property modification. Examples of modifications that might be desirable include changes in color, clarity, tack, open time, wetting ability, dyability, melt viscosity, softening point, thermal stability, polarity, biodegradability, strength and stiffness. Examples of potential reactive co-monomers are maleic anhydride, styrene, chloromethylstyrene, acrylonitrile, methylmethacrylate, acrylic acid, butene, butadiene and acrylamide.

Further property modification of the composition may be accomplished by the inclusion of non-reactive additives. These may include anti-oxidants, anti-static agents, pigments, dyes, nucleating agents, fillers, tackifiers, waxes, diluents, heat stabilizers, anti-blocking agents, plasticizers, and anti-microbials. The additives may be incorporated into the atactic polypropylene prior to grafting, during the grafting process, or as a separate compounding step following the graft polymerization, the last of which has the advantage of avoiding the possibility of harmful interaction between any of the property modifying additives and the chemistry of the grafting process.

While the grafted APP can be used by itself as a flame retardant adhesive, hot melt adhesives more commonly also contain tackifiers to improve bonding, and waxes to modify solidification rate and to reduce viscosity. Such materials may also be added to the graft copolymers.

In addition to the other property modifiers that have been discussed, the composition may also contain flame retardants other than the halogenated styrene. These may be of the reactive type such as bis(2-chloroethyl)-vinylphosphonate or acrylic acid esters of halogenated alcohols, or of the inert additive type such as antimony oxide, triphenylphosphate, hexabromocyclododecane, brominated diphenyl oxides, tetrabromophthalate esters, or halogenated phosphate esters. The purpose of including these auxiliary flame retardants is typically to improve efficiency and lower cost.

The grafting is carried out at temperatures sufficiently hot enough to reduce viscosity of the molten atactic polypropylene, ensure thorough mixing during and after monomer addition, and promote decomposition of the initiator with the resulting rapid polymerization of the monomer. Temperatures from 120° C. to 230° C. may be used depending on the molecular weight and crystallinity of the atactic polypropylene, with ranges from 170° C. to 200° C. being preferred.

The grafting proceeds readily at atmospheric pressure. The elevated pressures encountered in plastics processing equipment may also be used. Following polymerization, a vacuum may be applied to reduce the amount of unreacted monomer.

The duration of the grafting procedure will depend upon the temperature as well as the grafting technique used. In free radical initiated grafting, the duration will also depend upon the chosen initiator and the efficiency of mixing. Generally, however, durations ranging from about 1 second to several hours can be used, with about 10 to about 300 seconds resulting in an efficient polymerization.

Graft polymerization will typically result in the production both of grafted atactic polypropylene and of homopolymer of the selected monomer. It has been found that the grafted APP and any homopolymer present remain well intermixed, even during processing. The homopolymer could alternatively be removed, but this is not necessary and the preferred composition therefore includes both grafted atactic polypropylene and homopolymer. In addition, the adhesive compositions may include non-halogenated APP.

The preferred APP products used in the present invention have a flame retarding amount of bromine, about 1 weight % or more, based on the weight of the APP. This bromine may be present either in the grafted atactic polypropylene or in a homopolymer mixed with the grafted atactic polypropylene. In any event, however, the grafted atactic polypropylene copolymer includes at least about 0.5%, and more preferably at least about 1%, bromine by weight. In addition, the hot melt adhesives may include non-halogenated APP, in which case it is preferred that there be included at least about 1% bromine by weight based on the APP component, i.e. the combined weight of the grafted APP, the homopolymer and the non-halogenated APP.

The APP component of the hot melt adhesives, including the grafted APP, homopolymer and non-halogenated APP, will generally include about 5% to about 50% bromine by weight of the APP component, and more preferably about 15% to about 45% bromine by weight. The APP component will preferably include about 1% to about 40% bromine based on the weight of the overall adhesive formulation with tackifier and wax, and more preferably about 1% to about 30%.

The APP component may also be obtained from a bromine-concentrated APP graft copolymer having about 10% to about 60% bromine by weight, or more preferably about 30% to about 50% bromine by weight, of the copolymer. The bromine content may come from the graft copolymer and any homopolymer present, but in any event at least about half of the bromine is present on the graft copolymers. In this approach, the grafted atactic polypropylene copolymer is let down with non-halogenated atactic polypropylene prior to use in the hot melt adhesive composition, to have the desired level of bromine content.

A certain amount of bromine may also be present as a part of unreacted monomer, but this form is not preferred and the amount of unreacted monomer is desired to be relatively low. The amount of unreacted monomer is preferably at most about 3% by weight, and more preferably at most about 1% by weight, of the APP component. These low levels are generally achieved in the described preparation of the preferred products without the need for further processing steps. However, when desired the unreacted monomer can be removed, for example, by placing the graft polymerization products under vacuum.

The let down blends and other APP compositions used in the present invention, and the resulting hot melt adhesives, have demonstrated excellent adhesive and flame retarding properties. The combination of improved flame retardancy and desirable physical properties provides a significant and unexpected advantage.

Further details regarding the manner of preparation of the grafted compositions useful in the present invention are evidenced in the copending patent application, Ser. No. 07/510087, filed on Apr. 17, 1990. Applicants incorporate herein by reference the additional disclosure contained in said application. It will be appreciated, however, that the particular manner of production of the grafted APP compositions used in the hot melt adhesives of the present invention is not critical, and that other methods for production of the described APP component are suitable. Further description of methods for the production of grafted APP materials as defined herein is therefore not believed to be necessary.

In addition to the graft atactic polypropylene, the hot melt adhesives of the present invention may include tackifiers, wax-like materials, and other additives conventionally used in APP-based adhesive formulations. In general, the graft APP is useful with the variety of adhesive compositions in which APP is useful or compatible. It is an aspect of the present invention that in such hot melt adhesives including atactic polypropylene, there is provided the improvement of using the described graft APP copolymers. These adhesives may include the graft copolymer alone or in combination with the homopolymer and/or non-halogenated APP. Prior art formulations may similarly be modified by replacing either some or all of the previously-used, non-halogenated APP with the grafted APP of the present invention, with or without the homopolymer also being present.

Tackifiers compatible and useful with the graft APP and overall hot melt adhesive compositions may be combined therewith. The tackifier will be added to provide an amount effective to give a desired tack or adhesiveness. It will be understood by those in the art that the selection of the tackifying agent and its amount is well within the skill in the art, and may be determined without undue experimentation. Various types and levels of tackifier may be chosen to adapt the hot melt adhesive formulation to particular applications. The specifics regarding the tackifying agent are therefore not critical to the present invention. A number of commercial tackifiers are readily available. Common tackifiers used in the art include petroleum or rosin esters and others described in the previously cited U.S. Pat. Nos. 4,404,299 and 4,325,853, and these disclosures are hereby incorporated by reference.

Similarly, any wax-like materials, typically synthetic and petroleum waxes, compatible and useful with the graft APP and overall hot melt adhesive compositions may be combined therewith. The wax-like materials are added to provide an amount effective to give a desired melt viscosity for the adhesive, and may also be included as a diluent to reduce cost of the composition. It will again be appreciated that the selection of the wax material and its amount is well within the skill in the art, and may be determined without undue experimentation. Various types and levels of waxes may be chosen to adapt the hot melt adhesive formulation to particular applications. The specifics regarding the wax materials are therefore not critical to the present invention. A number of commercial waxes are readily available. Common waxes used in the art include paraffin wax, microcrystalline polymeric wax, Fischer Tropsch wax, and others described in previously cited U.S. Pat. Nos. 4,404,299 and 4,325,853, and these disclosures are hereby incorporated by reference.

Other ingredients may also be included. For example, anti-oxidants such as hindered phenols and organic phosphites are typically used to prevent coloration and viscosity changes with heat aging. Also, diluents such as organic phosphates may also be beneficial in certain applications.

The graft atactic polypropylene copolymers, together with such other ingredients as are used, are combined in relative amounts to give the desired physical properties for the hot melt adhesive. For example, the hot melt adhesive may generally include from about 40 to about 60 weight % of the graft APP component; from about 25 to about 50 weight % of tackifier; and from about 10 to about 30 weight % of wax. The adhesive formulation may consist essentially of the APP component, tackifier and wax-like material. As used in this context, the term APP component refers, as before, to the graft atactic polypropylene alone or in combination with either or both homopolymer (of the grafting monomer or equivalent) and non-halogenated APP. Of course, in the case of an adhesive consisting essentially of these three components, other non-interfering ingredients may also be present, such as an anti-oxidant, mineral or organic fillers such as carbon black or calcium carbonate, etc.

The adhesive compositions of the present invention are solids at room temperature, but have melting points and melt viscosities in a range such that they can be readily applied to appropriate substrates using conventionally employed hot melt techniques and equipment. The compositions can be formulated to have ring and ball softening points within desired ranges, typically 80° C. to 105° C., and viscosities also within desired ranges, for example between 500 cps and 20,000 cps at 400° F.

The preparation of the compositions according to the invention does not present any difficulty and is typically carried out by homogeneous mixing of the various components at a suitable temperature, typically between 100° C. and 250° C. For example, a suitable adhesive is prepared by simply heating the grafted atactic polypropylene, and any other ingredients used, and stirring at 175° C. to obtain a homogeneous mixture. In a more general sense, past methods of preparation used for compositions containing non-halogenated APP are equally useful for the preparation of the composition as improved by the use of grafted APP.

The hot melt adhesive compositions of the present invention are useful for the variety of applications to which APP-based adhesives are suited. Examples of such uses include the preparation of laminated structures, book binding, packaging, etc. The inventive compositions, as a hot melt, are applied in conventional fashion to at least one of the surfaces to be bonded. The appropriate surfaces are then joined together, typically under at least light pressure, and the assembly is cooled to ambient temperature to solidify and set the adhesive.

The invention will be further described with reference to the following specific Examples. However, it will be understood that these Examples are illustrative and not restrictive in nature. In the following Examples, percents indicated are percents by weight unless indicated otherwise.

EXAMPLE 1

Preparation of Graft Copolymers 150 g of atactic polypropylene (ring and ball softening point = 136° C.; Brookfield Viscosity at 149° C. (300° F.) = 9,900 centipoise) were melted in the Brabender Prep Center at 160° C. A mixture of:

| | |
|---|---|
| 142.5 g | Great Lakes Dibromostyrene |
| 3.0 g | Dicumylperoxide |
| 4.5 g | 1-Dodecanethiol | was added over a 5-minute period while mixing at 50 rpm's. The temperature was increased to 180° C. and the product removed from the bowl. The product was a leathery solid containing 29.4% bromine and 0.16% residual monomer.

EXAMPLE 2

Flammability of Adhesive Compositions

Hot melt adhesives were prepared by dry blending components at room temperature, followed by thorough mixing after being melted in a 190° C. oven. The molten material was poured onto a 4×7 inch strip of Type E fiberglass veil and was drawn down to a 1 mm thickness. After hardening, oxygen index was determined on 4×0.25 inch strips. Results are shown in Table 1.

TABLE 1

| Flame Retardancy of APP-g-Dibromostyrene Adhesives | | | | | |
|---|---|---|---|---|---|
| | Formulation Number | | | | |
| | 1 | 2 | 3 | 4 | 5 |
| Atactic Polypropylene, % (Note 1) | 100 | — | 50 | 60 | — |
| APP-g-DBS,% (Note 2) | — | 100 | 50 | — | 60 |
| Wingtack 95,% (Note 3) | — | — | — | 40 | 40 |
| Br (as % of composition, calc.) | 0 | 29.4 | 14.7 | 0 | 17.6 |
| Oxygen Index (Note 4) | 19.0 | 24.5 | 21.5 | 19.0 | 21.0 |

Notes:
1. From The International Group, Inc.,.Ring and Ball softening point = 136° C.
2. Prepared using 50 parts APP + (47.5 parts DBS + 1.0 parts dicumyl peroxide + 1.5 parts 1-dodecanethiol).
3. Goodyear Tire and Rubber Co.
4. ASTM D 2863-77, 1 mm thick sections on Type E fiberglass veil support.

The oxygen indices demonstrate that a 1:1 APP-g-dibromostyrene copolymer (Formulation 2) is substantially less flammable than ungrafted APP. Furthermore, the graft copolymer can be blended or let down with ungrafted APP as in Formulation 3 and still exhibit a higher degree of flame retardancy than the ungrafted APP.

The results also show that the graft copolymer can be modified with a tackifier (Formulation 5) to produce a higher strength adhesive composition. Flame resistance is, again, superior to that of ungrafted APP plus tackifier.

EXAMPLE 3

Adhesive Strength of Graft Copolymer Adhesives

Graft copolymers were prepared as in Example 1, but the ratio of DBS to APP was varied. Using a portion of each copolymer, a tackifier was melt blended in as in Example 2. These compositions, both with and without tackifier, were then used to laminate two layers of 5 mil thick aluminum foil by pressing at 130° C. and about 40 psi of pressure for 5 minutes. Adhesive strength was then determined for 1 inch wide strips. The results are shown in Table 2.

TABLE 2

Strength of APP-g-Dibromostyrene Adhesives

| DBS in Graft, % | APP in Graft, % | Peel strength, lbs/in (Note 1) | |
|---|---|---|---|
| | | Graft Alone | With Tackifier (Note 2) |
| 0 | 100 | 1.2 | 11.5 |
| 15 | 85 | 3.0 | 13.9 |
| 30 | 70 | 2.1 | 17.1 |
| 50 | 50 | 2.2 | 17.8 |
| 70 | 30 | 2.1 | 2.5 |

Notes:
1. ASTM D 1876-72, aluminum to aluminum.
2. 60 parts of APP or APP-g-DBS plus 40 parts of Wingtack 95.

These tests show that all ratios of the graft copolymers provide greater adhesive strength than ungrafted APP. When combined with a tackifier, only the graft containing 70% DBS has a lower adhesive strength than the base APP plus tackifier. The fact that our composition not only reduces flammability but also improves adhesive strength illustrates the significance of our invention.

EXAMPLE 4

Melt Viscosity of Graft Copolymer Adhesives

Graft copolymers were prepared as in Example 1, but with varying amounts of 1-dodecanethiol chain transfer agent added to the DBS. These materials were then either tested neat, or combined with a tackifier as in Example 2. Melt flow—a measure of viscosity—was determined for all compositions. See Table 3.

TABLE 3

Melt Flow of Dibromostyrene Adhesives

| DBS in Graft, % | APP in Graft, % | Thiol, as % of DBS | Melt Index, g/10 min. (Note 1) | |
|---|---|---|---|---|
| | | | Graft Alone | With Tack. (Note 2) |
| 0 | 100 | 0.0 | 0.9 | 34.4 |
| 50 | 50 | 0.0 | No flow | 0.2 |
| 50 | 50 | 1.0 | 0.5 | 12.2 |
| 50 | 50 | 2.0 | 3.4 | 16.2 |
| 50 | 50 | 3.0 | 8.3 | 23.2 |

Notes:
1. ASTM D 1238 125° C./325 g.
2. 60 parts of APP of APP-g-DBS plus 40 parts of Wingtack 95.

The melt flows show that the graft copolymers can be modified to have a lower viscosity (higher melt index) than the ungrafted APP. Since it is desirable to have low viscosity in a hot melt adhesive in order to facilitate pumping, permit the application of thinner and more economical layers of adhesive, and allow operation at lower temperatures, this option is another advantage of our invention.

With the addition of a tackifier, the melt index of the ungrafted APP does increase a large amount, but the indication is that the graft can be modified to at least match it.

EXAMPLE 5

Stability of Molten Adhesive Compositions

A 1:1 APP-g-DBS copolymer was prepared as in Example 1. Using the procedures of Example 2, three adhesives were prepared including two comparative compositions containing additive-type flame retardants. Portions of each adhesive were placed in 15×120 mm test tubes which were then stored upright in a 190° C. oven for 7 hours. The test tubes were cooled, the glass was broken away, and portions of the cylinders of adhesive were analyzed at the top and bottom. Note the distribution of bromine shown in Table 4.

TABLE 4

Stability of Molten Adhesive Compositions

| | Formulation Number | | |
|---|---|---|---|
| | 5 | 6 | 7 |
| Atactic Polypropylene, g | — | 120 | 120 |
| APP-g-DBS (29.4% Br) | 120 | — | — |
| Wingtack 95, g | 80 | 80 | 80 |
| DBS Homopol, g (58% Br) (Note 1) | — | 87.1 | — |
| DE-83R, g (83% Br) (Note 2) | — | — | 53.8 |
| Br, as % of composition (calc.) | 17.6 | 17.6 | 17.6 |
| Br Top, % (Note 3) | 17.5 | 2.3 | 15.2 |
| Br Bottom, % (Note 3) | 16.8 | 54.6 | 45.1 |

Notes:
1. Homopolymer of the same grade of DBS used to produce the graft copolymer.
2. Decabromodiphenyl Oxide, Great Lakes Chemical Corp.
3. After 7 hours at 190° C. without agitation.

It is apparent from these results that the graft copolymer formulation remains homogeneous while additive-type flame retardants stratify. They also demonstrate that it is essential for at least a portion of the DBS to be grafted to the APP. Formulation 6 which is a physical mixture of homopolymerized DBS and APP plus tackifier, visibly separates as soon as mixing is stopped.

While the invention has been described in detail in the foregoing description and its specific Examples, the same is to be considered as illustrative and not restrictive in character. It is to be understood that only the preferred embodiments have been described, and that all changes and modifications that come within the spirit of the invention are desired to be protected.

What is claimed is:

1. A hot melt adhesive composition which comprises:
a tackifying resin;
a wax; and
a flame retardant atactic polypropylene component including a graft copolymer composition having the formula:

wherein n is > 1, APP is atactic polypropylene, and S is a grafted side chain having brominated monomeric units of the formula:

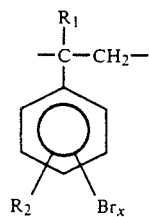

wherein x = 1 to 4, $R_1$ is H or $CH_3$, and $R_2$ is H or a $C_{1-4}$ lower alkyl group.

2. The hot melt adhesive composition of claim 1 in which said graft copolymer includes at least about 1% bromine by weight of graft copolymer.

3. The hot melt composition of claim 2 in which said graft copolymer includes about 1% to about 20% by weight bromine.

4. The hot melt composition of claim 1 in which said graft copolymer includes at least about 5% bromine by weight of the overall composition.

5. The hot melt composition of claim 4 in which said graft copolymer includes about 5% to about 30% bromine by weight of the overall composition.

6. The hot melt composition of claim 1 in which $R_1$ and $R_2$ are each hydrogen.

7. The hot melt composition of claim 1 in which at least about 80% of said brominated monomeric units have formulas wherein $x=2$.

8. The hot melt composition of claim 1 and which consists essentially of said tackifying resin, said wax, and said flame retardant graft copolymer composition.

9. The hot melt composition of claim 8 and including about 40% to about 60% graft copolymer, about 25% to about 50% tackifying resin, and about 10% to about 30% wax.

10. The hot melt composition of claim 1 in which said atactic polypropylene component further includes a homopolymer of said brominated monomeric units.

11. The hot melt composition of claim 10 in which said graft copolymer and said homopolymer together include at least about 1% bromine by weight of the combined weight of said graft copolymer and said homopolymer.

12. The hot melt composition of claim 10 in which said atactic polypropylene component includes at least about 5% bromine by weight of the overall adhesive composition.

13. The hot melt composition of claim 12 and in which said atactic polypropylene component includes about 5% to about 30% bromine by weight of the overall adhesive composition.

14. The hot melt composition of claim 10 and which consists essentially of said tackifying resin, said wax, said flame retardant graft copolymer composition and said homopolymer.

15. The hot melt composition of claim 10 in which said atactic polypropylene component further comprises non-halogenated atactic polypropylene.

16. The hot melt composition of claim 15 in which said graft copolymer and said homopolymer together include at least about 1% bromine by weight of the combined weight of said graft copolymer, said homopolymer and said non-halogenated atactic polypropylene.

17. The hot melt composition of claim 15 in which said atactic polypropylene component includes at least about 5% bromine by weight of the overall composition.

18. The hot melt composition of claim 15 and which consists essentially of said tackifying resin, said wax, said flame retardant graft copolymer composition, said homopolymer and said non-halogenated atactic polypropylene.

19. In a hot melt adhesive composition including an atactic polypropylene polymer, the improvement comprising using as the atactic polypropylene polymer a flame retardant graft copolymer composition comprising:

wherein n is $>1$, APP is atactic polypropylene, and S is a grafted side chain having brominated monomeric units of the formula:

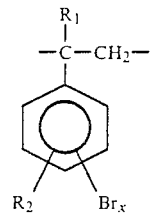

wherein $x=1$ to 4, $R_1$ is H or $CH_3$, and $R_2$ is H or a $C_{1-4}$ lower alkyl group.

20. The improvement of claim 19 in which said graft copolymer includes at least about 1% bromine by weight of graft copolymer.

21. The improvement of claim 19 in which said hot melt adhesive composition consists essentially of a tackifying resin, a wax, and said flame retardant graft copolymer composition.

22. The improvement of claim 19 and which further comprises including in the hot melt adhesive composition a homopolymer of said brominated monomeric units.

23. The improvement of claim 22 in which said graft copolymer and said homopolymer together include about 1% to about 20% bromine by weight of the combined weight of said graft copolymer and said homopolymer.

24. The composition of claim 22 in which said hot melt adhesive composition consists essentially of a tackifying resin, a wax, said flame retardant graft copolymer composition and said homopolymer.

25. The improvement of claim 22 and which further comprises including in the hot melt adhesive composition a non-halogenated atactic polypropylene.

26. The improvement of claim 25 in which said graft copolymer and said homopolymer together include about 1% to about 20% bromine by weight of the combined weight of said graft copolymer, said homopolymer and said non-halogenated atactic polypropylene.

27. The improvement of claim 26 in which said hot melt adhesive composition consists essentially of a tackifying resin, a wax, said flame retardant graft copolymer composition, said homopolymer and said non-halogenated atactic polypropylene.

* * * * *